United States Patent [19]

Seelig

[11] Patent Number: 5,654,621

[45] Date of Patent: Aug. 5, 1997

[54] METHOD AND ARRANGEMENT FOR AUTOMATIC CONTACTLESS CHARGING

[75] Inventor: Anton Seelig, Floersheim, Germany

[73] Assignee: Daimler-Benz Aktiengesellschaft, Stuttgart, Germany

[21] Appl. No.: 424,371

[22] PCT Filed: Oct. 27, 1993

[86] PCT No.: PCT/EP93/02976

§ 371 Date: Aug. 16, 1995

§ 102(e) Date: Aug. 16, 1995

[87] PCT Pub. No.: WO94/10004

PCT Pub. Date: May 11, 1994

[30] Foreign Application Priority Data

Oct. 28, 1992 [DE] Germany .......... 42 36 286.5

[51] Int. Cl.$^6$ ................................. H01M 10/44
[52] U.S. Cl. ........................... 320/2; 320/21
[58] Field of Search .............. 320/2, 21, 28, 320/54; 901/17; 364/483, 550; 336/DIG. 2

[56] References Cited

U.S. PATENT DOCUMENTS

| | | | |
|---|---|---|---|
| 4,347,472 | 8/1982 | Lemelson | 320/2 |
| 4,507,044 | 3/1985 | Hutchins et al. | 414/744 |
| 4,656,412 | 4/1987 | McLyman | 320/39 |
| 4,800,328 | 1/1989 | Bolger et al. | 320/2 |
| 5,157,319 | 10/1992 | Klontz et al. | 320/2 |
| 5,341,083 | 8/1994 | Klontz et al. | 320/2 |

OTHER PUBLICATIONS

"Hands Free Electric Vehicle Charging", Jun., 1992, No. 338, Emsworth, Great Britain, p. 517.

Primary Examiner—Peter S. Wong
Assistant Examiner—Gregory J. Toatley, Jr.
Attorney, Agent, or Firm—Spencer & Frank

[57] ABSTRACT

In a process for contactless energy transmission in charging the battery of a vehicle, in particular an electric car, by means of an inductive transmitter having a primary element (1) and a secondary element (2) which is attached to the vehicle, the secondary element (2) is made freely accessible and the primary element is power driven to move in all three spatial coordinates within a predetermined spatial area. In this process the primary element (1) and the secondary element (2) are placed, under sensor control, in predetermined positions relative to each other and then electrical energy is transmitted in the medium frequency range by means of the inductive transmitter.

24 Claims, 3 Drawing Sheets

$$U \approx f \frac{I\mu}{\delta} A$$

$$\frac{P}{f} = \text{CONST}$$

$$I_\mu \approx B \cdot \delta$$

METHOD AND ARRANGEMENT FOR AUTOMATIC CONTACTLESS CHARGING

BACKGROUND OF THE INVENTION

1. Field of the Invention

The invention relates to a method and an arrangement for contactless energy transmission during charging of a vehicle battery, e.g., of an electric car.

2. Background Information

It is already known to charge the battery of electric vehicles by means of inductive charging stations (Rhein-Main-Presse, Jul. 18, 1992). To this end, a charging coil is manually inserted into the slot of an adapter disposed on the outside of the vehicle, and electrical energy is subsequently transmitted from the charging device to the battery. Although this system of energy transmission operates reliably and is safe to use, since the secondary coil is protected in the adapter, the insertion of the charging coil into the adapter is oriented toward conventional fueling of a gasoline-powered car and is rather awkward in terms of handling. Moreover, the consequences of having the adapter disposed on the outside of the electric car can include mechanical, aerodynamic and aesthetic disadvantages to the vehicle. Another disadvantage is a path-impairing cable is connected to the electric car, and is in place for a significantly longer time during charging of the battery than, for example, the connection of a gasoline hose to a gasoline vehicle. Furthermore, charging devices that have different charge outputs and are produced by different manufacturers should be able to be coupled to the vehicle without great effort. Slow charging with a home charging device that has a low output and fast charging using a high-output charging device, for example in a parking garage while the owner shops, will become standard practice. Because the dimensions of the charging coil vary with the output, in an arrangement that includes a coil to be pushed into a slot, both the slot and the coil must be of the dimensions of the highest output.

Therefore, the problem exists of achieving simple and convenient handling in addition to high operating and application reliability during charging of the battery of an electric car. It is to be noted here that, on the one hand, simple and convenient handling of such a system, without an excessively high mechanical outlay, requires easy accessibility to the inductive energy-transmission components, but, on the other hand, the greater danger of impairment of the operating reliability and safety in use exists because of the stronger association with environmental influences, particularly pollution or the like.

SUMMARY OF THE INVENTION

An object of the present invention is to provide a method of contactless energy transmission during charging of an electric vehicle, the method being simple and convenient for the user with high operating reliability and safety in use. A further object of the invention is to provide a corresponding apparatus which also permits the coupling of inductive energy-transmission components designed for different outputs without an extra expenditure for the charging device of lesser output. This object is accomplished by the features the advantageous embodiments of the invention which are disclosed.

BRIEF DESCRIPTION OF THE DRAWINGS

The invention is described in detail below in conjunction with drawing figures, in which.

DETAILED DESCRIPTION OF THE PREFERRED EMBODIMENTS

Figure 1:
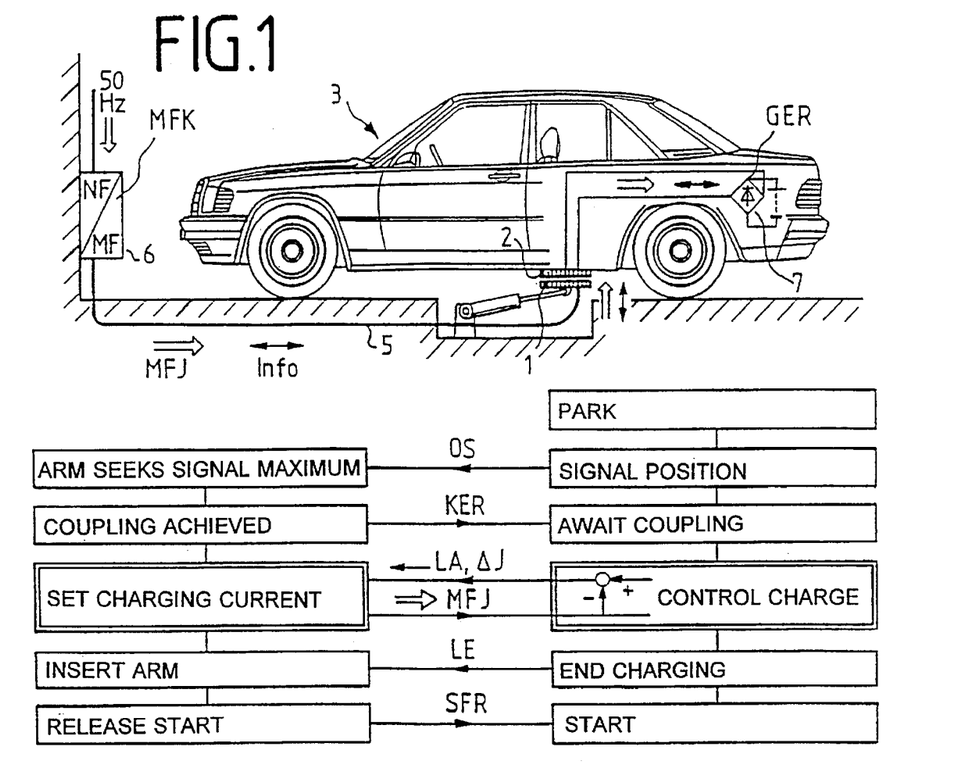
FIG. 1 schematically shows an apparatus according to the invention, and illustrates the method according to the invention for contactless energy transmission.

FIG. 1 shows an apparatus according to the invention in which the primary element 1 of an inductive transmitter is brought into an approach position with respect to the secondary element 2 of the transmitter, which is located on the underside of an electric car 3. As will be explained in detail in connection with FIG. 6, the primary element 1 is moved by a sensor-controlled mechanism, corresponding to the different phases of the charging process. In the embodiment according to FIG. 1, the secondary element 2 is disposed to be readily accessible on the underside of the electric car 3. On the other hand, the option exists of disposing it at other locations on the vehicle 3, and covering it for mechanical protection against environmental influences, such as dirt, etc. This option makes the secondary element 2 readily accessible as soon as the vehicle 3 is brought into the approach position with respect to the primary element 1 of the transmitter. As soon as the secondary element 2 is readily accessible, the primary element 1 can be brought into a predetermined position with respect to the secondary element 2 by means of a sensor-controlled motor. The invention is based on the realization that, if transmitting elements 1, 2 and the primary- and secondary-side electronic components are correspondingly designed, at a medium frequency of, for example, 25 kHz, electrical energy can be transmitted from primary element 1 to secondary element 2 via an air gap of a magnitude of up to approximately 1 cm. A slotted guide for the primary element 1 is therefore not necessary. With respect to energy and signals, the primary element 1 is connected to the charging device 6 via lines 5. The generation of the medium frequency of, for example, 25 kHz, and the setting of the output, take place in the charging device 6. In the example of FIG. 1, the transmission system is connected to a three-phase network of 400 volts and 50 Hertz. This type of solution is advantageous for fast charging with charge outputs in the 10 kW range, for example in parking garages while the owner shops. A home charging device of low output can be placed on the vehicle 3, beneath the secondary element 2, with a primary element that can be adjusted in height. The secondary element 2 is connected to a rectifier 7, by way of which the battery of the electric car 3 is charged.

Figure 2:
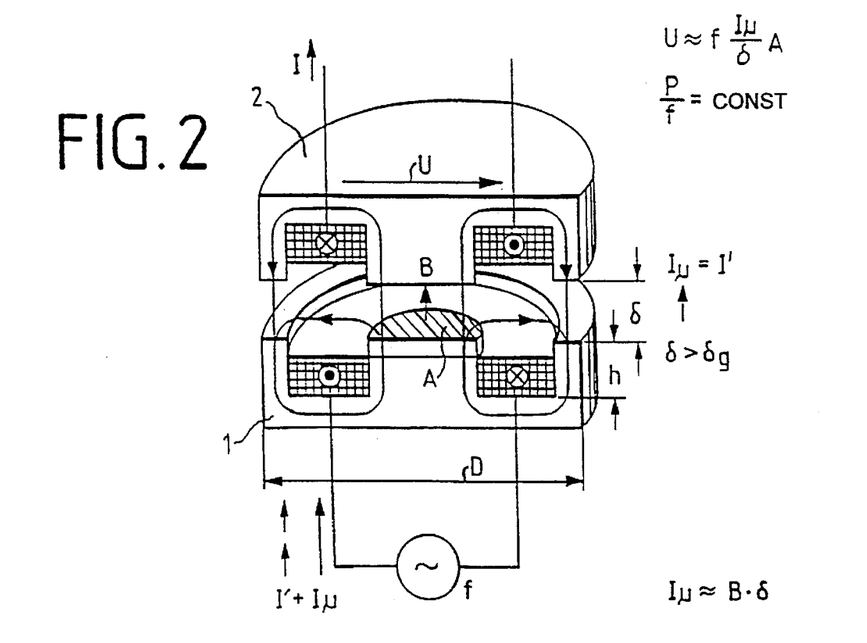
FIG. 2 schematically shows an embodiment of an inductive transmitter.

Primary element 1 and secondary element 2 of the inductive transmitter are essentially inductive coils which are designed for an energy transmission via an air gap, have a soft-magnetic core and are cast integrally in plastic or the like to provide insulation against the environment. FIG. 2 shows a simple embodiment of such an indicative transmitter. Primary element 1 and secondary element 2 are configured in shell shape, and face one another with spacing δ.

Ferrites are suitable magnetic materials. This transmitter is distinguished from a conventional transformer by the influence of the air gap $\delta$ on the magnetic flux density B and the magnetization current I$\mu$. The relationship between the two values is illustrated by the characteristic curve of the magnetization of the soft-magnetic material. The magnetization current I$\mu$ is typically small with respect to the current I$\mu$ transmitted to the input circuit. In a contactless transmitter, as in FIG. 2, the magnetization current I$\mu$ is proportional to the product of the magnetic flux density B and the gap width $\delta$. Because the magnetization current does not contribute to the output transport, but, like the transmitted current, causes losses and stresses the source, it is necessary to limit it as of a limit gap width $\delta_g$ to the intensity of the transmitted current I'. Therefore, above the limit gap width, the magnetic flux density B must be lowered reciprocally to the gap width. With larger gap widths, it is significantly lower than the values typically in magnetic materials. Nevertheless, when the transmitters are of small dimensions, the frequency f must be sufficiently high for a large voltage U and a corresponding output to be transmitted. In transmitters that are not thermally charged to capacity, the transmittable output P is proportional to the frequency f. With a given gap width $\delta$, however, it is not possible to arbitrarily reduce the field cross-section A and the diameter D of a transmitter by increasing the frequency. As the diameter D decreases, the portion of the magnetic flux leakage that only surrounds one winding increases, at the cost of the main flux linked to the two windings. This causes the magnetic coupling of the windings and the transmitted voltage to decrease and the inductive resistance in the circuits to increase. With gap widths in the cm range, transmission elements having a diameter of 20 to 25 cm are required for outputs of 1 kW to 10 kW. The winding height h is small in relation to the diameter D. The transmitter elements therefore have a flat structural shape. With large gap widths, they comprise ferrite plates with flat coils placed on top of them. To avoid the high eddy-current losses which occur at high frequencies, the coil conductors are constructed from thin, insulated individual wires having a layer that varies inside the cross-section. Contactless transmission elements for 25 kHz require only a small percentage of the material needed for 50-Hertz transformers of identical output, so that their output-related losses are also smaller.

Figure 3:
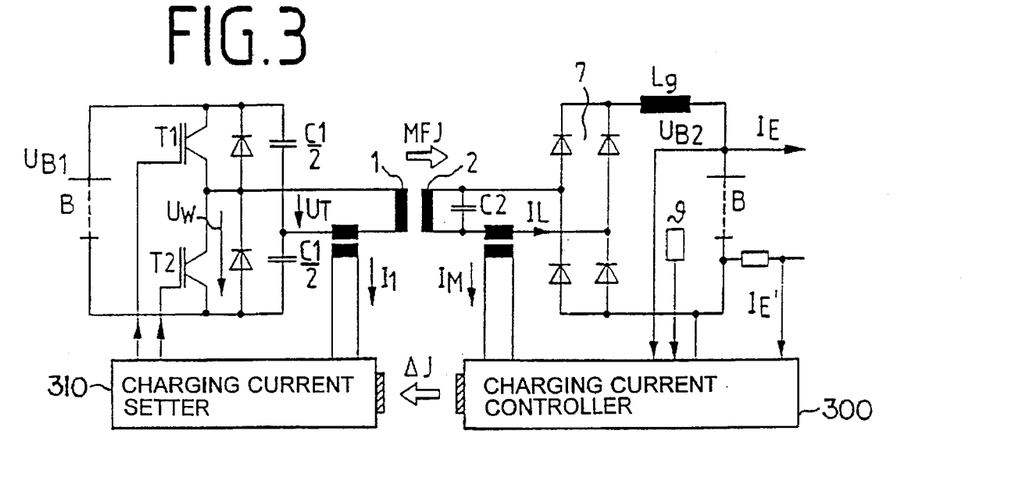
FIG. 3 shows a preferred embodiment of the electronic components of the apparatus of the invention minus the sensor arrangement.

FIG. 3 shows a possible embodiment of a medium-frequency source connected to the primary element 1 and of the rectifier 7 connected to the secondary element 2. In this instance, UB1 and UB2 respectively indicate the operating voltage of the inverter and the voltage of the battery to be charged. IL indicates the charging current transmitted by way of the elements 1 and 2. Contactless transmission of information takes place between the charging current setter 310 of a inverter 7 and the charging current controller 300 of the battery. The charging current controller 300 obtains its desired value for charging current control from battery status detection. This detection uses sensors for detecting the battery voltage UB2, the discharge current IE, the charging current IL, the temperature $\theta$ and possibly further values that characterize the status of the battery, as well as a processor and a memory, with whose assistance the status of the battery can be tracked over its service life. The desired charging current value is selected to correspond to the determined battery status, and the deviation $\Delta J$ is transmitted to the actual charging current setter 310 of the inverter.

Figure 4:
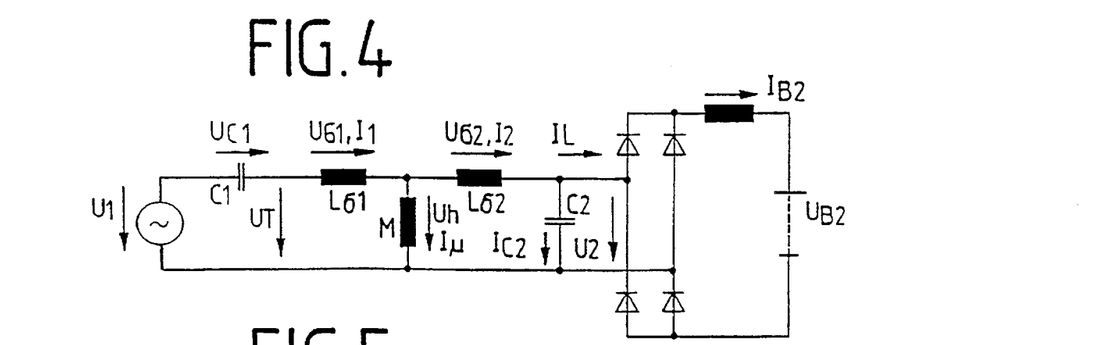
FIG. 4 shows an equivalent circuit diagram for the embodiment according to FIG. 2.
Figure 5:
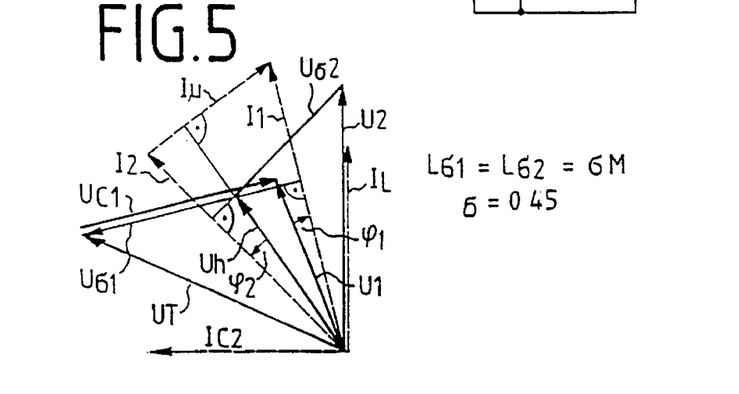
FIG. 5 shows the vector diagram belonging to the circuit diagram of FIG. 3.

FIG. 4 shows an equivalent circuit diagram of the circuit according to FIG. 2. Accordingly, the primary leakage inductance L$\sigma$1 of the transmitter, with the parallel circuit of the two capacitors C1/2 of the inverter, forms a series resonant circuit. In contrast, the secondary side of the transmitter and the capacitor C2 form a parallel resonant circuit. The electrical values shown relate to the fundamental modes. The input voltage U1 is the fundamental mode of the inverter voltage UW. The mode amplitudes can be set by means of changing the inverter frequency or modulating the percentage duty cycle of the power semiconductors T1, T2. The further observations are based on the second method, which permits the setting of the voltage fundamental modes U1 at a nearly constant frequency. The highest input voltage U1 and the greatest mode amplitudes result in T1 and T2 turn-on times of identical length. The steady state is characterized by the turn-on ratio of the power semiconductors T1 and in which the desired charging current IL flows and the primary-side voltage source UB1 delivers just the sum of secondary-side charging output and switching losses. The function of the transmission method is described more precisely in the vector diagram in FIG. 5. As the capacitor voltage U2 passes through zero, the nearly constant battery current IB2 is commutated from one bridge diagonal to the other. On the side of the alternating current, the fundamental mode IL of this current is identical in phase to the capacitor voltage U2. The capacity of the capacitor C2 is selected such that, at maximum charging current, the secondary-side leakage voltage U$\sigma$2 is completely compensated, i.e., in this operating state, the transmitting secondary side, with the rectifier load and the capacitor C2, acts virtually like a resistor connected in parallel with the primary inductance M. In the vector diagram, this is shown by the small phase angle $\phi$2 between the primary field voltage U$_h$ and the secondary current I2. The primary-side leakage inductance L$\sigma$1 and the counter-inductance M are compensated by the two capacitors C1/2 of the inverter to the extent that only a small phase shift $\phi$1 exists between the input voltage U1 and the input current I1 on the primary side. The leakage factor of $\sigma$=0.45 used in the vector diagram corresponds to a mechanical air gap of approximately 1.5 cm in a pot-core transmitter according to FIG. 2.

The switching elements are designed such that the series resonant circuit of the primary side and the parallel resonant circuit of the secondary side resonate at the same frequency. The maximum output is transmitted at the resonance point.

The battery-charging current IL is measured inductively in FIG. 3. The measuring current IM is supplied to the charging current controller 300. As explained above, the current deviation $\Delta I$ transmitted to the charging current setter 310 changes either the inverter frequency or the percentage duty cycle of the power semiconductors T1 and T2 until the required charging current has been set.

Figure 6:
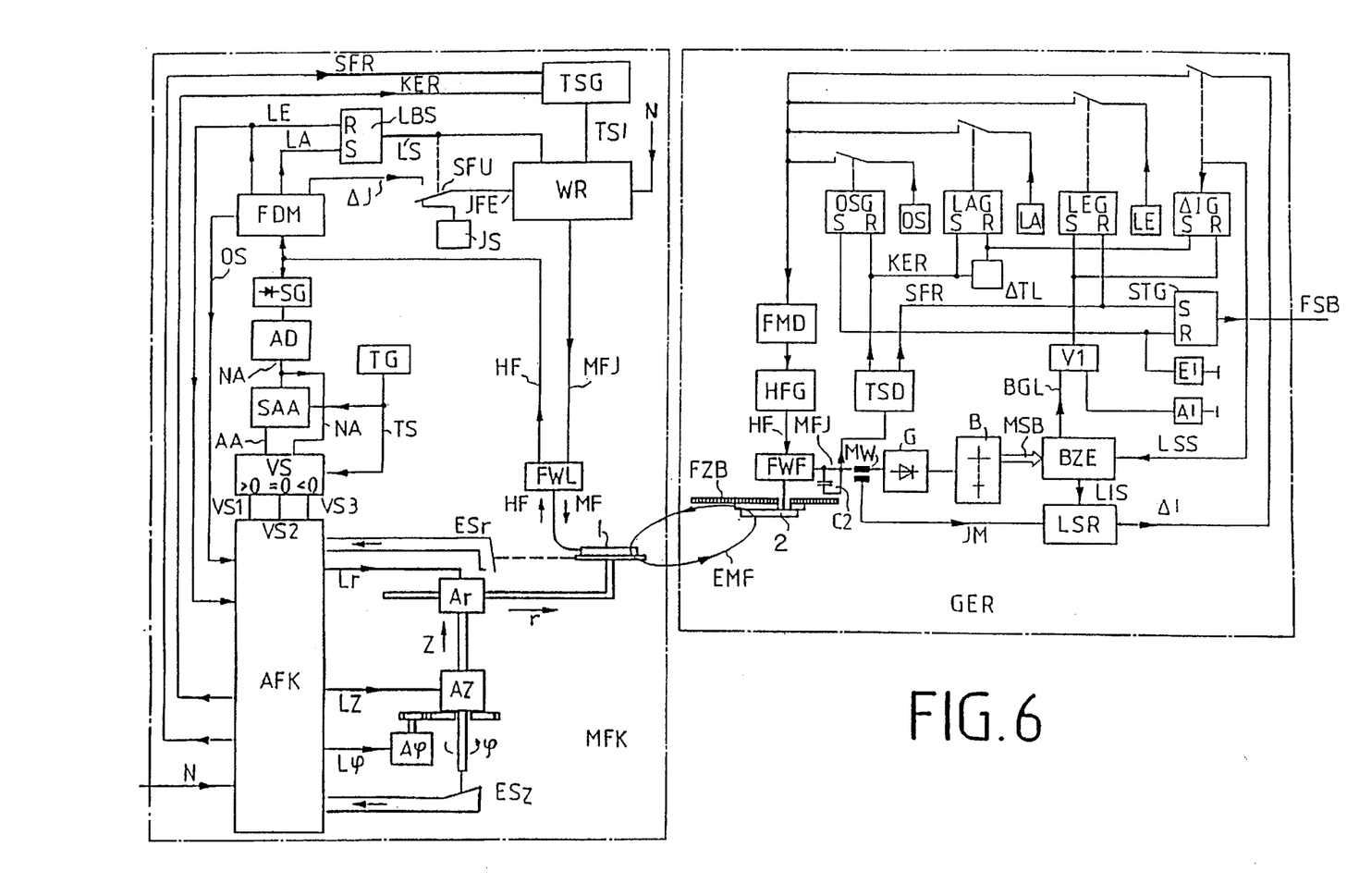
FIG. 6 shows a block diagram of the position control of the primary element.

FIG. 6 shows the block diagram of an arrangement for automated charging. The arrangement comprises the middle-frequency current source and coupling apparatus MFK of the charging device and the rectification, detection and control apparatus GER on the vehicle 3. After the charging device has been activated, for example by the deposit of a coin, a switch-on pulse EI is emitted by the vehicle 3, for example by way of a key. This switch-on pulse produces the orientation signal OS via the input S of the orientation signal connector OSG. At the same time, the start signal generator STG is reset via the resetting input R, and the signal FSB, "vehicle ready for start," is cut off. The orientation signal OS is only applied to the input of the frequency modulator FMD. It modulates a high-frequency generator HFG. The high-frequency signal HF reaches the transmission element ÜEF 2 on the bottom of the vehicle via a frequency-dividing network FWF. A coupling to the transmission element of the charging element 1 arises by way of the electromagnetic field emitted by the transmission element 2. The high-frequency signal HF received by the charging transmission element 1 is separated from the power circuit of the coil by the frequency-dividing network FWL, and supplied to a frequency modulator FDM and a peak rectifier SG. The peak rectifier SG rectifies the amplitudes of the high-frequency signal and supplies them to an analog/digital converter AD. The output signal NA continuously indicates the digital value of the newest amplitude. This amplitude value is now supplied to a memory SAA in the rhythm of a clock signal produced by the clock generator TG. With each clock signal, the old amplitude signal that was stored during the previous cycle appears at the output of the memory SAA. The respectively newest amplitude signal NA and the old amplitude signal AA are supplied to a comparison stage VS. The comparison of the old amplitude signal AA and the newest amplitude signal NA indicates whether a signal increases, remains the same or becomes smaller. As the amplitude increases, the newest amplitude signal is constantly greater than the old one. This is shown by the comparison stage, with a logical-level 1 at its output VS1. If the amplitude no longer changes, the old and new amplitude signals are identical. This is shown by the output VS2, with a logical 1. If, in contrast, the old amplitude signal AA is greater than the new amplitude signal, that is, the amplitude decreases, the signal VS3 is logical-level 1. These amplitude comparison signals are supplied to a drive guide and coupling device AFK. The drive guide and coupling device AFK controls the drives AΦ, Az and Ar of the coupling mechanism. The drive Aφ moves a rotary disk, on which the drive Az for adjusting the height of the charging transmission element 1 is mounted. The drive Az moves the drive Ar in the vertical direction by way of a spindle. The drive Ar extends an arm, which supports the transmission element 1, in the radial direction. All three drives form a kinematic chain, i.e., the movements of the individual coordinates add in space. The control of the 3 drives is effected by means of the amplitude comparison signals VS1, VS2, VS3 in such a way that the charging transmission element 1 is always guided in the direction of increasing amplitudes of the received HF signal. With the occurrence of the orientation signal OS, the drive guide and coupling device AFK triggers, for example, a rotational movement of the arm to the left. If the amplitude increases, the movement is continued until the maximum has been reached. If, in contrast, the amplitude decreases, the direction of rotation is reversed. If the best possible proximal position of the two transmission elements is reached due to the rotational movement, that is, the amplitude no longer changes, which is indicated by the signal VS2, the rotational movement is halted and the drive Ar for extending the arm in the radial direction is actuated. The charging transmission element 1 now moves in the radial direction toward the transmission element 2 on the vehicle 3 until the charging transmission element 1 comes to stand directly beneath the transmission element 2 on the vehicle 3. The maximum HF signal is to be anticipated in this position. Finally, the vertical movement is effected via the drive Az until the two transmission elements touch one another. To increase the coupling precision, the approach attempt can be repeated. To this end, the charging transmission element 1 is moved back in the z-direction by a few millimeters, so that there is no more contact between the two transmission elements. When the approach process is re-initiated, it is to be expected that higher coupling precision will be achieved when the approach is made from a lesser initial distance. When the two transmission elements subsequently touch, the drives are halted and the signal "coupling achieved," KER, is emitted by the drive guide and coupling device AFK. The signal "coupling achieved" KER is supplied to a keyed or on/off signal generator TSG. The keyed signal generator TSG converts the signals to be sent to the vehicle 3 into a keyed modulation of the inverter output current. For this purpose, the keyed signal TSI switches the inverter on and off in a rhythm typical for signals. During this signal emission, the current reference value converter SFU of the inverter is still located in the base position, in which only one current reference value Is used for transmitting the keyed signals is connected to the current reference value input IFE of the inverter. In the charging transmission element 1, the middle frequency output current MFI of the inverter, which is modulated in the rhythm of the signal KER, now generates an electromagnetic field that is modulated to correspond to the keyed signal and induces a corresponding voltage in the charging transmission element 2. The information obtained in the rhythm of the keying is now demodulated by the keyed signal demodulator TSD. The signal "coupling achieved" KER received on the vehicle switches off the orientation signal connector OSG via the reset input R, and switches on the charging initiation signal generator LAG via the setting input S. At the same time, a timing stage ATL, which limits the duration of the charging initiation signal LA, is activated. After the time ATL has expired, the switch is automatically made from the charging initiation signal LA to the current deviation signal ΔI in the clock generator TG. The charging initiation signal LA transmitted to the charging apparatus on the same path as the orientation signal OS now switches on the charging operation memory LBS and thus switches on the inverter. Moreover, the current reference value converter SFU is switched from the current reference value IS to the current reference signal ΔI subsequently emitted by the frequency modulator FDM. The current reference value signal ΔI is a measure for the necessary increase in the battery charging current. This signal is formed by the charging current controller LSR on the vehicle, and corresponds to the difference between the desired value LIS of the charging current and the actual charging current detected by the measuring signal IM. The measuring signal IM is obtained from the transmitted current MFI by means of the measurement converter MW. The desired value LIS of the charging current is formed by the detection BZE of the battery state. The detection of the battery state monitors the charging current, the discharge current, the temperature and other values of the battery that are relevant to the state of the battery, and thus knows the charging current need in each charging state. The desired value LIS for the charging current is switched from the battery state detection to the charging current controller with the setting of the current deviation indicator ΔIG by the charging current switching signal LLS. If the battery is charged, the battery state detection switches on the charging end signal generator LEG via the signal BGL. For this purpose, the signal BGL is supplied via the OR stage V1 to the setting input of the charging end signal generator LEG, together with a switch-off signal which can be predetermined manually by a keyed generator and breaks off the charging process. At the same time the charging end signal generator LEG is set, the current deviation signal generator ΔIG is reset in its base position. Instead of the current deviation signal, the charging end signal is now transmitted to the charging device. The charging end signal resets the charging operation memory LBS in its base position. Thus, the inverter and current transmission to the vehicle are shut off. At the same time, in the drive guide and coupling device AFK, the charging end signal triggers the recall of the drive coordinates in the base position. Once they have reached the base position, the end switch ESr is operated by the radius coordinates, and the end switch ESZ is operated by the SZ-coordinates, The drive guide and coupling device AFK subsequently emits the start release signal SFR. The start release signal now switches the inverter on and off again via the keyed signal generator TSG and the keyed signal TSI. In this decoupled state of the transmission elements 1 and 2, no energy can be transmitted, but a sufficiently high signal voltage is induced in the transmission element 2 to demodulate the keyed signal demodulator on the vehicle. The demodulated start release signal SFR now resets the charging end signal generator LEG and brings the start signal generator STG into the "vehicle ready to start" position, which is indicated by the signal FSB.

It will be understood that the above description of the present invention is susceptible to various modifications, changes and adaptations, and the same are intended to be comprehended within the meaning and range of equivalents of the appended claims.

I claim:

1. A method of contactless energy transmission during charging of a battery of a vehicle using an inductive transmission arrangement which includes:

a primary inductive element and a secondary inductive element, the secondary inductive element being disposed on the vehicle, the primary inductive element being movable with respect to the vehicle, the primary inductive element for moving into an approach position with respect to the secondary inductive element to achieve magnetic coupling with the secondary inductive element, and a charging device having an inverter for supplying the primary inductive element with a current having a frequency greater than about 20 kHz, the charging device additionally having a demodulation apparatus, and coupling detection circuitry which includes a peak rectifier, an analog-digital converter, a memory controlled by a clock generator, and a comparison stage, wherein capacitors are provided which resonate with the inductance of the primary inductive element and the inductance of the secondary inductive element, there being an a gap on the order of centimeters between the primary and secondary inductive elements, wherein a battery state detection and charging current control means is provided in the vehicle, wherein a means of contactless transmission of information from the vehicle to the charging device is provided in the vehicle, the means for contactless transmission of information including a high frequency generator disposed in the vehicle for producing a high frequency signal, and a modulating apparatus configured as a frequency modulator for producing a modulated high frequency signal, wherein an orientation signal emitter is provided on the vehicle to supply an orientation signal, wherein there is a charging current setter associated with the inverter of the charging device, and wherein there is at least one electronic switch associated with the inverter, the method comprising:

(a) measuring a battery charging current and determining a deviation of the measured battery charging current from a predetermined desired charging current value, with the battery state detection and charging current control means;

(b) transmitting the determined charging current deviation, under control of the means for contactless transmission of information, to the charging current setter associated with the inverter of the charging device, step (b) including (b-1) modulating the high frequency signal with a charging current deviation signal produced by the battery state detection and charging control means, using the modulating apparatus, (b-2) transmitting the modulated high frequency signal produced in step (b-1) through an electromagnetic field to the demodulation apparatus of the charging device, (b-3) using the demodulation apparatus to regenerate the charging current deviation signal, and (b-4) supplying the regenerated charging current deviation signal to the inverter;

(c) controlling switching time or switching frequency of the at least one electronic switch of the inverter supplying the current to the primary inductive element, so that the charging current deviation becomes zero; and (d) before steps (a) through (c) are conducted, finding a favorable approach position and magnetic coupling between the movable primary inductive element and the secondary inductive element disposed on the vehicle, step (d) including (d-1) supplying an orientation signal from the orientation signal emitter provided on the vehicle to the modulation apparatus, (d-2) modulating the high frequency signal with the orientation signal as the primary inductive element approaches the secondary inductive element, and (d-3) transmitting the modulated signal produced in step (d-2) from the vehicle to the charging device, (d-4) demodulating the signal transmitted in step (d-3), and (d-4) using the coupling detection circuitry to indicate whether an amplitude of the orientation signal, and, therefore, coupling between the primary inductive element and the secondary inductive element disposed on the vehicle, increases, decreases, or remains the same.

2. A method as defined in claim 1, wherein, the movable primary inductive element is attached to a moveable arm and moved by drive motors in three spatial coordinates to approach the secondary inductive element, wherein the secondary inductive element is positioned, with the vehicle, in a spatial region reachable by the primary inductive element attached to the moveable arm, wherein, as a function of output signals of the comparison stage, the drive motors which move the movable arm are set in operation and halted by drive guide and coupling means, the drive guide and coupling means implementing conventional drive control and regulating functions, wherein the demodulator identifies the orientation signal emitted from the vehicle and supplies it to the drive guide and coupling means, and wherein the drive guide and coupling means halts all of the drive motors and emits a signal indicating coupling has been achieved when an evaluation of the output signals of the comparison stage indicates no increase in the amplitude of the received orientation signal.

3. A method as defined in claim 2, wherein the signal indicating coupling has been achieved causes a keyed signal emitter to switch the inverter on and off in a rhythmical fashion, wherein the signal indicating coupling has been achieved is transmitted to the vehicle and regenerated by a keyed signal demodulator, switches off the orientation signal, and switches on a charging initiation signal for a predetermined pulse time duration, wherein the charging initiation signal is switched off by the modulation apparatus after termination of the predetermined pulse time duration, and the charging current deviation signal is connected to the modulation apparatus, and wherein the charging initiation signal demodulated and received by the charging device connects a current guide input of the inverter to the charging current deviation signal subsequently emitted by the demodulator.

4. A method as defined in claim 2, further comprising:

automatically returning the primary inductive element to a resting position after a charging process has ended, wherein a charging end signal transmitted by the vehicle resets a charging operation memory for switching off the inverter by means of a current reference variable changeover switch for switching a current reference value input from the modulator to the current reference variable switched on prior to the charging process, wherein the charging end signal is also supplied to the drive guide and coupling means, and triggers a backward movement of the drive motors, wherein end switches halt the drive motors in a resting position of the movable arm with the primary inductive element, and cause the drive guide and coupling means to emit a start release signal, wherein the start release signal is supplied to a keyed signal generator means for switching the inverter on and off in a rhythmical manner, wherein the start release signal is received at the vehicle and regenerated by a keyed signal demodulator, resets a charging end signal generator, and brings a start signal generator into a vehicle ready to start state.

5. A method of contactless energy transmission during charging of a battery of a vehicle using an inductive transmission arrangement which includes:

a primary inductive element and a secondary inductive element, the secondary inductive element being disposed on the vehicle, the primary inductive element being movable with respect to the vehicle, the primary inductive element for moving into an approach position with respect to the secondary inductive element to achieve magnetic coupling with the secondary inductive element, and a charging device having an inverter for supplying the primary inductive element with a current having a frequency greater than about 20 kHz, wherein capacitors are provided which resonate with the inductance of the primary inductive element and the inductance of the secondary inductive element, there being a gap on the order of centimeters between the primary and secondary inductive elements, wherein a battery state detection and charging current control means is provided in the vehicle, wherein a means for contactless transmission of information is provided on the vehicle, the means for contactless transmission of information including a high frequency generator, a modulating apparatus, and a charging current deviation indicator, wherein there is a charging current setter associated with the inverter of the charging device, and wherein there is at least one electronic switch associated with the inverter, the method comprising:

(a) measuring a battery charging current and determining a deviation of the measured battery charging current from a predetermined desired charging current value, with the battery state detection and charging current control means, the battery state detection and charging current control means including a battery state detection means a charging current controller, and a measurement controller; step (a) including (a-1) transmitting a desired value for a charging current from the battery state detection means to the charging current controller, (a-2) obtaining a measuring signal with the aid of the measurement converter, the measuring signal being proportional to the current induced in the secondary inductive element, and (a-3) supplying the measuring signal to the charging current controller, the charging current controller forming a charging current deviation signal from the desired value for a charging current and the measuring signal;

(b) transmitting the determined charging current deviation, under control of the means for contactless transmission of information, to the charging current setter associated with the inverter of the charging device, step (b) including (b-1) supplying the charging current deviation signal to the charging current deviation indicator, and (b-2) using the charge current deviation indicator to connect the charging current deviation signal to the modulating apparatus, which in turn modulates a high frequency signal generated by the high frequency generator;

(c) controlling switching time or switching frequency of the at least one electronic switch of the inverter supplying the current to the primary inductive element, so that the charging current deviation becomes zero; and (d) when the battery is charged, emitting a signal from the battery state detection means to indicate the battery is charged, the signal emitted by the battery state detection means switching the charging current deviation signal off at the modulating apparatus by resetting the charging current deviation indicator, and producing a charging end signal for transmission to the charging device and to the modulating apparatus to turn off the modulating apparatus.

6. A method as defined in claim 5, wherein the means for contactless transmission of information from the vehicle to the charging device includes a high frequency generator disposed on the vehicle for producing a high frequency signal, and a modulation apparatus configured as a frequency modulator for modulating the charging current deviation, thereby producing a modulated high frequency signal, wherein the modulated high frequency signal is transmitted through an electromagnetic field to a demodulation apparatus at the charging device, wherein the demodulation apparatus regenerates the signal for the charging current deviation in the charging device, and wherein the regenerated signal is supplied to the inverter that produces the high frequency current.

7. An apparatus for contactless energy transmission, comprising:

a primary inductive element and a secondary inductive element, the secondary inductive element being disposed on a vehicle, the primary inductive element being movable with respect to the vehicle to a position at which the primary inductive element is spaced apart from the secondary inductive element to form a transformer with a gap, a charging device having a capacitor which is connected in series with the primary inductive element and having an inverter for supplying the primary inductive element with an oscillating current via the capacitor, the inverter having an inverter frequency greater than about 20 kHz, another capacitor carried by the vehicle, the another capacitor being connected in parallel to the secondary inductive element, the capacitors having capacitances which are selected so that the capacitors resonate with the transformer with a gap at around the inverter frequency; and means for adjusting the amplitude of oscillation of the oscillating current by changing the inverter frequency, wherein the diameter or outer dimensions of the primary inductive element and the secondary inductive element are approximately ten to twenty times the gap width which remains between the two transmission elements when they form the transformer with a gap.

8. An apparatus as defined in claim 7, further comprising means for detecting a charging current deviation, wherein the secondary inductive element disposed on the vehicle serves as a transmission element for contactless transmission of a high frequency signal for transmitting the charging current deviation from the vehicle to the charging device.

9. An apparatus as defined in claim 8, wherein the primary inductive element serves as a transmission element of the charging apparatus which receives the high-frequency signal containing the charging current deviation.

10. An apparatus as defined in claim 7, wherein the primary inductive element and the secondary inductive element have a shell or disk shape, and wherein a winding height is small relative to the diameter or outer dimensions of the elements.

11. An apparatus as defined in claim 7, wherein the gap between the primary and secondary inductive elements, when they form the transformer with a gap, lies in a plane, and wherein the primary inductive element is positioned on one side of this plane and the secondary inductive element is positioned on the other side.

12. A method according to claim 11, wherein the step of adjusting the amplitude of the oscillating current comprises:

measuring a battery charging current and determining a deviation of the measured battery charging current from a predetermined desired charging current value, with a battery state detection and charging current control means provided in the vehicle;

transmitting the determined charging current deviation, under control of a means for contactless transmission of information provided in the vehicle, to a charging current setter associated with the inverter of the charging device; and controlling a switching frequency of at least one electronic switch provided in the inverter so that the charging current deviation becomes zero.

13. A method as defined in claim 12, wherein the means for contactless transmission of information from the vehicle to the charging device includes a high frequency generator disposed on the vehicle for producing a high frequency signal, and a modulation apparatus configured as a frequency modulator for producing a modulated high frequency signal, wherein the modulated high frequency signal is transmitted through an electromagnetic field to a demodulation apparatus at the charging device, wherein the demodulation apparatus regenerates the signal for the charging current deviation in the charging device, and wherein the regenerated signal is supplied to the inverter.

14. A method as defined in claim 12, wherein a battery state detection means is disposed on the vehicle and transmits a desired value for a charging current to a charging current controller, wherein a measuring signal, obtained with the aid of a measurement converter and proportional to the current transmitted to the primary inductive element, is additionally supplied to the charging current controller, wherein the charging current controller forms a charging current deviation signal from the desired value for a charging current and the measuring signal, and supplies the charging current deviation signal to a charging current deviation indicator which connects the charging current deviation signal to the modulating apparatus, which in turn modulates the high frequency generator, and wherein, when the battery is charged, the battery state detection means emits a signal indicating the battery is charged which switches the charging current deviation signal off at the modulating apparatus by resetting the charging current deviation indicator, and produces a charging end signal for transmission to the charging device and to the modulating apparatus to turn off the modulating apparatus.

15. A method as defined in claim 13, wherein the step of moving the primary inductive element comprises:

emitting an orientation signal from an orientation signal emitter provided on the vehicle, and supplying the orientation signal to the modulation apparatus to produce an orientation-modulated high frequency signal as the primary inductive element approaches the secondary inductive element, and transmitting the orientation-modulated high frequency signal from the vehicle to the charging device, wherein the charging device further includes coupling detection circuitry, including:

a peak rectifier, an analog-digital converter, a memory controlled by a clock generator, and a comparison stage, and wherein signals from the coupling detection circuitry indicate whether an amplitude of the orientation signal, and, therefore, coupling between the primary inductive element and the secondary inductive element disposed on the vehicle, increases, decreases, or remains the same.

16. A method as defined in claim 15, wherein the movable primary inductive element is attached to a moveable arm and moved by drive motors in three spatial coordinates to approach the secondary inductive element, wherein the secondary inductive element is positioned, with the vehicle, in a spatial region reachable by the primary inductive element attached to the moveable arm, wherein, as a function of output signals of the comparison stage, the drive motors which move the movable arm are set in operation and halted by drive guide and coupling means, the drive guide and coupling means implementing conventional drive control and regulating functions, wherein the demodulator identifies the orientation signal emitted from the vehicle and supplies it to the drive guide and coupling means, and wherein the drive guide and coupling means halts all of the drive motors and emits a signal indicating coupling has been achieved when an evaluation of the output signals of the comparison stage indicates no increase in the amplitude of the received orientation signal.

17. A method as defined in claim 16, wherein the signal indicating coupling has been achieved causes a keyed signal emitter to switch the inverter on and off in a rhythmical fashion, wherein the signal indicating coupling has been achieved is transmitted to the vehicle and regenerated by a keyed signal demodulator, switches off the orientation signal, and switches on a charging initiation signal for a predetermined pulse time duration, wherein the charging initiation signal is switched off by the modulation apparatus after termination of the predetermined pulse time duration, and the charging current deviation signal is connected to the modulation apparatus, and wherein the charging initiation signal demodulated and received by the charging device connects a current guide input of the inverter to the charging current deviation signal subsequently emitted by the demodulator.

18. A method as defined in claim 16, further comprising:

automatically returning the primary inductive element to a resting position after a charging process has ended, wherein a charging end signal transmitted by the vehicle resets a charging operation memory for switching off the inverter by means of a current reference variable changeover switch for switching a current reference value input from the modulator to the current reference variable switched on prior to the charging process, wherein the charging end signal is also supplied to the drive guide and coupling means, and triggers a backward movement of the drive motors, wherein end switches halt the drive motors in a resting position of the movable arm with the primary inductive element, and cause the drive guide and coupling means to emit a start release signal, wherein the start release signal is supplied to a keyed signal generator means for switching the inverter on and off in a rhythmical manner, and wherein the start release signal is received at the vehicle and regenerated by a keyed signal demodulator, resets a charging end signal generator, and brings a start signal generator into a vehicle ready to start state.

19. A method of contactless energy transmission during charging of a battery of a vehicle using an inductive transmission arrangement, the inductive transmission arrangement including a primary and a secondary inductive element, the secondary inductive element being disposed on the vehicle, the primary inductive element being movable with respect to the vehicle to a position adjacent the secondary inductive element to achieve magnetic coupling with the secondary inductive element, plastic material on the primary and secondary inductive elements for electrical insulation and protection, the plastic material on each of the inductive elements having a respective thickness, a charging device having a capacitor which is connected in series with the primary inductive element and having an inverter for supplying an oscillating current to the primary inductive element via the capacitor, the inverter having an inverter frequency which is greater than about 20 kHz, and another capacitor carried by the vehicle, the another capacitor being connected in parallel to the secondary inductive element, wherein said method comprises the steps of:

moving the primary inductive element toward the secondary inductive element to a position at which the primary inductive element is spaced apart from the secondary inductive element to form a transformer with a gap, the gap between the primary and secondary inductive elements being at least as large as the sum of the thickness of the plastic material on the primary inductive element and the thickness of the plastic material on the secondary inductive element, the capacitors having capacitances which are selected so that the capacitors resonate with the transformer with a gap at around the inverter frequency; and adjusting the amplitude of oscillation of the oscillating current by changing the inverter frequency.

20. A method as defined in claim 19, wherein the diameter or outer dimensions of the primary inductive element and the secondary inductive element are approximately ten to twenty times the gap width which remains between the two transmission elements when they form the transformer with a gap, this gap width being up to the order of centimeters.

21. A method as defined in claim 20, further comprising means for detecting a charging current deviation with a detecting means in the vehicle, and using a modulated high frequency signal for transmitting the charging current deviation from the vehicle via the secondary inductive element to the charging device.

22. A method as defined in claim 21, wherein the primary inductive element receives the modulated high-frequency signal containing the charging current deviation.

23. A method as defined in claim 20, wherein the primary inductive element and the secondary inductive element have a shell or disk shape, and wherein a winding height is small relative to the diameter or outer dimensions of the elements.

24. A method as defined in claim 19, wherein the step of moving the primary inductive element is conducted by moving the primary inductive element along three spatial coordinates.

* * * * *